United States Patent [19]

Fakley et al.

[11] Patent Number: 5,597,539
[45] Date of Patent: Jan. 28, 1997

[54] CATALYTIC PROCESS

[75] Inventors: Martin E. Fakley, Stockton on Tees; Friedrich H. H. Valentin, Letchworth, both of England

[73] Assignee: Imperial Chemical Industries PLC, United Kingdom

[21] Appl. No.: 436,369

[22] PCT Filed: Oct. 25, 1993

[86] PCT No.: PCT/GB93/02196

§ 371 Date: Jun. 26, 1995

§ 102(e) Date: Jun. 26, 1995

[87] PCT Pub. No.: WO94/11091

PCT Pub. Date: May 26, 1994

[30] Foreign Application Priority Data

Nov. 18, 1992 [GB] United Kingdom ............ 9224201

[51] Int. Cl.⁶ ............................................. B01D 47/00
[52] U.S. Cl. ............................................ 423/210; 422/4
[58] Field of Search ......................... 423/210; 422/4, 422/5, 120, 122

[56] References Cited

U.S. PATENT DOCUMENTS

| | | | |
|---|---|---|---|
| 4,443,342 | 4/1984 | Stas et al. | 210/759 |
| 4,764,286 | 8/1988 | Bon et al. | 210/757 |

FOREIGN PATENT DOCUMENTS

| | | |
|---|---|---|
| 0057624 | 8/1982 | European Pat. Off. |
| 0057624 | 9/1982 | European Pat. Off. |
| 2624642 | 12/1977 | Germany |
| 3221795A1 | 12/1983 | Germany |
| 2047217 | 11/1980 | United Kingdom |

*Primary Examiner*—Michael Lewis
*Assistant Examiner*—Amy M. Harding

[57] ABSTRACT

A process for scrubbing volatile or odoriferous substances from a gas stream (1) with aqueous liquor (7) containing hypochlorite or hydrogen peroxide as an oxidant (15) and recycling (12) part of the resultant liquor after passage through a bed (11) of catalyst for the decomposition of the oxidant is disclosed.

10 Claims, 1 Drawing Sheet

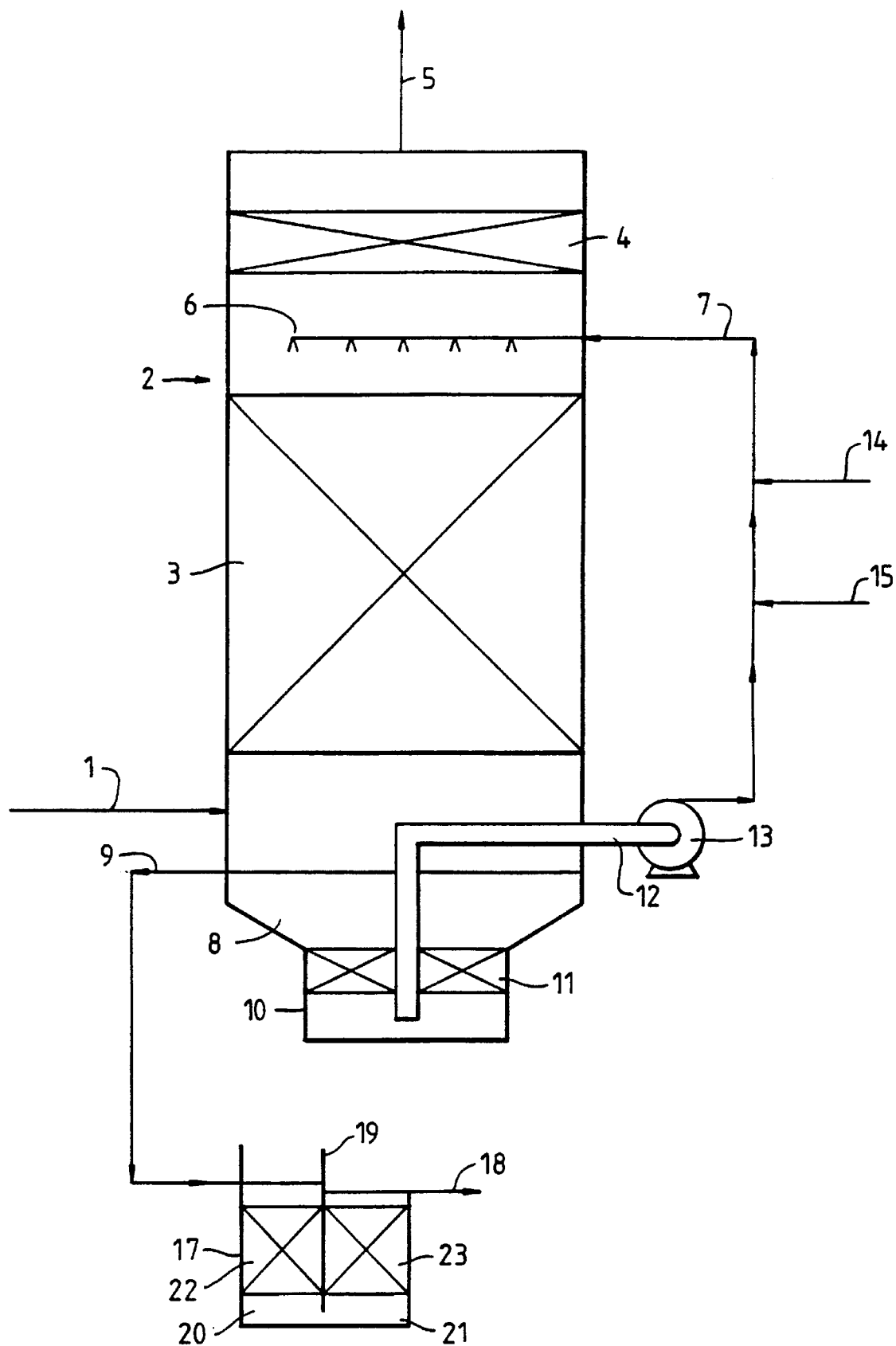

5,597,539

CATALYTIC PROCESS

This invention relates to a catalytic process and in particular to a catalytic process for the removal of odours and/or volatile organic compounds from gas streams.

Discharge of gas streams, such as air, containing volatile organic and/or odoriferous substances into the atmosphere is often objectionable on environmental grounds; not only may the odour be objectionable, but in some cases the odoriferous and/or volatile organic compounds may be carcinogenic and/or toxic, and/or discharge into the atmosphere may be unacceptable for other reasons. Examples of such gas streams include the exhaust gases from operations such as meat processing, eg fat rendering; sewage treatment; foundries; paint spraying and the like. Examples of objectionable odoriferous substances that may occur in such gas streams include aliphatic amines and aldehydes; sulphur compounds such as hydrogen sulphide, mercaptans and organic sulphides; phenols, cresols, and xylenols; while volatile organic compounds include a wide range of aliphatic and aromatic compounds such as short chain aldehydes, ketones, alcohols, esters, and halogenated hydrocarbons. It is thus desired to treat the gas stream to remove the aforesaid substances and/or to convert then to a less objectionable material. Oxidation often results in the conversion of such substances to less odorous and/or less volatile compounds or to inorganic end products.

The gas streams may be treated to remove those substances, and/or render them less objectionable, by passing the gas stream through a scrubber packing in counter-current flow to an aqueous solution containing an oxidant such as hydrogen peroxide or hypochlorite ions. The oxidant effects oxidation of the unwanted components to less objectionable compounds. The addition of a suitable metal salt, eg a nickel salt, such as nickel sulphate, where the oxidant is hypochlorite or an iron salt where the oxidant is hydrogen peroxide, to the aqueous solution catalyses the decomposition of the oxidant rendering it even more effective.

However the presence of such dissolved metal salts presents problems of corrosion of the apparatus and also presents an effluent problem since the discharge of aqueous solutions containing dissolved metal salts into sewage systems or into rivers is often environmentally unacceptable.

In the present invention a fixed bed of a metal oxide catalyst is utilised: not only are the problems of corrosion and effluent disposal avoided but also the amount of oxidant required to effect the desired degree of treatment may be decreased, and the intensity of oxidation enhanced.

It has been proposed in GB 2047217-B to de-odorise waste gases by passing the gas up through a packed column containing catalyst of nickel "peroxide" on an inert support in counter-current to a sodium hypochlorite solution passing down the column. There is thus vapour/liquid contact between the gas and the hypochlorite solution in the presence of the catalyst. Part of the liquor from the base of the column is recycled, together with fresh hypochlorite. One disadvantage of such a system is that to ensure adequate vapour/liquid contact in the presence of the catalyst, a significant resistance to flow of the gas through the tower is presented, necessitating the use of higher power fans to effect the gas flow. Also, as may inevitably happen from time to time, if the liquid flow is interrupted, the catalyst will dry out and allow salt to crystallise in the pores of the catalyst. This results in cracking and eventual break-up of the catalyst. Also there is a rick that any non-volatile, insoluble, organic compounds that may be entrained in the waste gas fed to the column will be deposited on the catalyst and thereby decreasing its effectiveness.

It has been proposed, for example in U.S. Pat. No. 3,944,487, EP 276044-B and EP 211530-A, to decompose organic pollutants in effluents by mixing the effluent containing the pollutant with an aqueous solution containing an oxidising agent such as hypochlorite and passing the mixture over a fixed bed of certain nickel catalysts. However there is no suggestion in those references of using a gaseous effluent, nor that the use of the catalyst may enable the quantity of hypochlorite required to be decreased.

Accordingly the present invention provides a process for the treatment of a gas stream containing one or more volatile organic and/or odoriferous substances comprising passing said gas stream through a scrubbing packing, feeding an aqueous liquor having an oxidant selected from hydrogen peroxide and hypochlorite ions dissolved therein to the packing whereby said liquor flows through the packing in vapour/liquid contact with said gas stream, whereby said substances are scrubbed from said gas stream into the aqueous liquor, and, after passage through said packing, collecting said aqueous liquor containing said substances in a reservoir, taking part of the liquor from said reservoir as recycle liquor, feeding said recycle liquor, together with a fresh aqueous solution of said oxidant, as the aqueous liquor fed to the packing, and passing at least said part of said recycle liquor through a fixed bed of a metal oxide catalyst for the decomposition of said oxidant before mixing said recycle liquor with the fresh oxidant solution.

The invention also provides apparatus for the treatment of a gas stream containing one or more volatile organic and/or odoriferous substances comprising: a scrubbing packing; means to feed said gas stream through said scrubbing packing; means to feed an aqueous liquor having an oxidant dissolved therein to said packing whereby said liquor flows through said packing in vapour/liquid contact with said gas stream; a reservoir to collect said aqueous liquor from said packing; means to extract part of the liquor from said reservoir as recycle liquor; means to add a fresh solution of said oxidant to said recycle liquor to form the aqueous liquor fed to said packing; a fixed bed of catalyst for the decomposition of said oxidant; and means to pass at least part of said recycle liquor through said catalyst bed before addition of the fresh oxidant solution to said recycle liquor.

As the gas passes through the packing it contacts the aqueous liquor flowing over the surfaces of the packing and undesired substances in the gas stream dissolve in the aqueous liquor. On contact of the liquor with the catalyst, decomposition of oxidant occurs and undesired substances are oxidised to less volatile and/or less objectionable materials.

The scrubbing packing is preferably disposed in a vertical column to the upper portion of which the aqueous liquor is fed while the gas to be treated is passed up through the column, so that there is counter-current vapour/liquid contact. It will be appreciated however that alternative scrubber configurations may be employed, eg a horizontal scrubber may be employed wherein the gas passes transversely through the packing while he liquor flows down the packing under the influence of gravity, so that there is transverse-current vapour/liquid contact.

In the present invention, part of the aqueous liquor from the reservoir is taken as recycle liquor and fed to means to distribute the liquor over the packing. Fresh oxidant solution is added to the recycle liquor before it is fed to the distributor. Part of the liquor from the reservoir is removed as an effluent stream, preferably before, in the circulation direction, the addition of the fresh oxidant solution. Conveniently the effluent steam comprises the overflow from the reservoir.

Preferably a demister is provided so that, after leaving the packing, the treated gas is largely freed of entrained liquor before discharge or further treatment as may be desired.

Control of the process is preferably effected by controlling the rate of addition of fresh oxidant solution so as to achieve a desired concentration of oxidant in the effluent stream. This control may be effected automatically by means of a suitable sensor system: thus where the oxidant is a hypochlorite solution, a redox sensor may be used to control the rate of addition of fresh hypochlorite to give a finite, but limited, chlorine content in the effluent stream.

At least part, preferably all, of the recycle liquor is contacted with the catalyst: to avoid the decomposition of unnecessarily large amounts of oxidant, necessitating the addition of large amounts of fresh oxidant solution, the catalyst is preferably not disposed as a bed essentially filling the reservoir. Rather it is preferred that the catalyst is disposed in a recycle conduit so that only that part of the liquor in the reservoir that is being recycled contacts the catalyst. The reservoir is preferably disposed beneath the packing, and the catalyst bed may be located within the reservoir so that gas evolved as a result of the reaction occurring during passage of the liquor through the catalyst mixes with the gas stream undergoing treatment. The catalyst bed can be separated from the remainder of the reservoir by suitable baffles defining the recycle conduit from the reservoir. Alternatively it may be more convenient in some plants to provide the catalyst bed in a separate vessel in the recycle line to which recycle liquor form the reservoir is fed.

Although it is preferred that all the recycle liquor is passed through the catalyst bed, in some cases it may be desirable to pass only part, preferably a major part, of the recycle liquor through the catalyst bed. In such as case a conduit, preferably having one or more valves to control the flow therethrough, may be provided as a bypass for the catalyst bed.

It is preferred that the catalyst bed is dimensioned such that the contact time of the recycle liquor with the catalyst is 1 to 10 sec. The catalyst bed is preferably disposed such that it is filled, ie flooded, with liquor. It will be appreciated that the catalyst bed may in fact comprise more than one volume containing the catalyst through which the recycle liquor passes. Such volumes of catalyst may be disposed in series or in parallel.

The catalyst may be in the form of pellets or granules each containing the catalytically active material, which is preferably oxides of at least one metal selected from copper, iron, manganese, chromium, nickel, and cobalt. Where the oxidant is hypochlorite, the catalyst preferably comprises nickel and/or copper, optionally together with oxides of at least one metal selected from iron, manganese, chromium, aluminium, and metals of Group IIa of the Periodic Table. Where the oxidant is hydrogen peroxide, the catalyst preferably comprises oxides of iron and/or manganese, optionally together with oxides of one or more other metals. The catalyst is preferably in the form of an intimate mixture of the metal oxide on a suitable inert, preferably porous, support. Examples of suitable catalysts include those described in the aforementioned EP 211530-A. EP 276044-B, or, particularly, those described in U.S. Pat. No. 5,041,408. Preferably the support comprises alumina or a calcium aluminate cement.

With nickel and/or cobalt based catalysts, the active catalyst is believed to be the oxides of nickel (or cobalt) in a higher valency state than in the nickel (II) oxide, NiO. Such higher oxides are conveniently termed nickel (or cobalt) "peroxides" although the presence of a true peroxide linkage is doubtful. The nickel and/or cobalt "peroxides" are preferably formed in situ by oxidation of nickel or cobalt oxide by the oxidant in the liquor. Before activation, ie before oxidation to the "peroxide" state, the catalyst preferably contains 10–70% by weight of nickel and/or cobalt oxide, and preferably nickel oxide forms at least 50% by weight of the combined weights of nickel and cobalt oxides. The catalyst preferably contains 0.2 to 10% by weight of iron oxide (expressed as $Fe_2O_3$) as this has been found to act as an activity promoter.

The scrubbing packing is of any suitable material that is inert to the liquor and preferably has a configuration that affords a good vapour/liquid contact with low resistance to the gas flow through the packing. Such packing are well known in the art. In contrast to previous processes, the packing is preferably free from catalyst for the decomposition of the oxidant.

The aqueous liquor fed to the packing preferably contains 0.25 to 150 millimoles of oxidant per litre and has a pH in the range 9 to 14 when the oxidant is hypochlorite and a pH of at least 7 where the oxidant is hydrogen peroxide. Alkali may be added as well as oxidant solution to maintain the pH within the desired range. The pH and oxidant concentration of the liquor in the reservoir, or of the effluent stream, or of the recycle stream after passage through the catalyst bed, may be monitored and the rate of addition of fresh oxidant and alkali (if any) controlled thereby to maintain the monitored pH and oxidant concentration within desired ranges. The aqueous liquor is preferably fed to the packing at a temperature of 5° to 60° C. The volumetric flow rate of gas through the packing is preferably 100 to 1500 times the volumetric flow rate of the aqueous liquor. The gas stream is preferably fed at such a temperature that the aqueous effluent from the bed has a temperature in the range 5° to 60° C.

Examples of volatile organic and/or odoriferous compounds that may be treated by this process include sulphur compounds, eg hydrogen sulphide; amines; aldehydes; ketones; aromatics; organo-halogen compounds, and solvents such as alcohols and esters. The process is of particular utility in treating gases containing less than 100 $g/m^3$ of the volatile organic and/or odoriferous compounds. Examples of gas streams that may be treated include waste gases from sewage plants, chemical plants, food processing plants, and animal product processing plants, eg fat rendering plants and tanneries, before those waste gases are discharged to the atmosphere.

In previous process treating gas streams containing amines using hypochlorite as the oxidant, it has been necessary to subject the gas stream to an amine removal step, eg by an acid scrubbing stage, to avoid the formation of chloramines. However, in the present invention such a preliminary amine removal scrubbing step is generally not required since we have found that the oxidation reaction is accelerated so that the amines tend to be oxidised rather than chlorinated.

As indicated above, an effluent steam is taken from the reservoir, preferably before passage through the catalyst bed, eg as an overflow from the reservoir. In many cases the concentration of oxidant in the effluent stream is at a level low enough to be acceptable for discharge. However in some cases it may be desirable to pass this effluent stream through a further fixed bed of an oxidant decomposition catalyst to decompose residual oxidant.

One embodiment is illustrated by reference to the accompanying drawing which is a diagrammatic representation of the flowsheet of the process.

Referring to the drawing, the gas to be treated is fed via line 1 to the lower portion of a column 2 having a packing 3 affording good vapour/liquid contact. The gas passes up the column 2 through the packing 3 and then through a demister 4 to an outlet line 5. Located in the upper portion of the column 2, below the demister 4, is a distributor 6 to which an aqueous liquor containing the oxidant is fed via line 7. The liquor thus flows under the action of gravity for the distributor 6 down through the packing 3 where it contacts the gas and scrubs odoriferous or volatile organic substances from the gas. The liquor loaded with those substances is then collected in a sump or reservoir 8 at the lower end of the column. An effluent stream 9 is taken as an overflow from reservoir 8 to maintain the liquor level in the reservoir. Reservoir 8 is provided with a region 10 extending over only a minor proportion of the cross sectional area of the reservoir. Within region 10 a fixed bed 11 of granules of a nickel oxide/cement catalyst is disposed supported on a perforate grid (not shown). An outlet recycle conduit 12 extends from below bed 11 to a recycle pump 13 from whence recycled liquor is fed to the distributor via line 7. Alternatively the catalyst bed may be provided in a separate vessel disposed in the recycle line before or after pump 13.

After passage of the recycle liquor through the catalyst bed, fresh alkali and oxidant solution is added via lines 14 and 15. Sensors (not shown) are provided to monitor the oxidant concentration and pH in the liquor after passage through the catalyst bed and control means (not shown) responsive to those sensors are provided to vary the rate of feed of alkali and fresh oxidant via lines 14 and 15. The alkali and oxidant solutions can be added as concentrated solutions and water added (via another line, not shown) as a diluent and to control the rate of overflow of the effluent stream 9.

If desired the concentration of oxidant remaining in the effluent stream 9 may be decreased further by feeding the effluent stream 9, eg by gravity, through a oxidant decomposition tank 17 having an outlet conduit 18 defining the liquid level in the tank 17. Tank 17 is provided with a vertical baffle 19 extending almost to the bottom of tank 17 thus dividing the tank into two serially connected zones 20, 21. Fixed beds 22, 23 of nickel oxide/cement oxidant decomposition catalyst are disposed in the zones 20, 21 beneath the level of the liquor in those zones so that the effluent from the reservoir 8 flows down through zone 20 and up through zone 21 before discharge. During passage through the catalyst beds 11, 22, and 23, oxidant in the liquor is decomposed and the odoriferous or volatile organic compounds are oxidised.

As an example apparatus similar to that shown in the drawing and having a column of height 9 m and diameter 3.7 m was used to treat foul smelling waste gas from a fat rendering plant. In this experiment the effluent treatment tank 17 and its associated beds 22, 23 were omitted. The catalyst bed 11 had a cross sectional area corresponding to about one third of the cross sectional area of the column. The gas was fed to the column at ambient temperature at a flow rate of 88000 Nm$^3$/h. An aqueous liquor of pH 9.8 and containing about 50 mg/l of sodium hypochlorite was fed to the distributor at 15°–20° C. and allowed to trickle down the packing. In this case the catalyst bed was positioned in a recycle conduit extending across part of the reservoir and separated from the remainder of the reservoir by a baffle arrangement. Liquor was pumped at a rate of about 90 l/s from the reservoir through the catalyst bed. The bed consisted of 0.2 m$^3$ of granules of a nickel oxide/cement catalyst of the type described in U.S. Pat. No. 5,041,408 disposed such that the contact time of the liquor passing through the bed was about 2.2 s. The volume of the reservoir was about 11.3 m$^3$ to that the residence time of the liquor therein was about 2 minutes. An aqueous sodium hydroxide solution was added via line 14 to control the pH at 9.8 and the rate of addition of fresh sodium hypochlorite solution (containing about 140 g/l of sodium hypochlorite) and diluent water (approx 1000 l/h) was controlled to give an overflow effluent containing less than 50 ppm by weight of sodium hypochlorite. The overflow effluent flow rate corresponds to the rate of addition of the diluent water, and sodium hydroxide and fresh sodium hypochlorite solutions. The nickel content of the effluent liquor was less than 1 ppm by weight. In order to obtain a gas from the outlet at the top of the column that was essentially free of objectionable odours, the rate of addition of the fresh sodium hypochlorite solution via line 15 was about 10 l/h.

By way of comparison, the experiment was repeated with the omission of the fixed catalyst bed but with a nickel salt solution being added to the recycled liquor. To obtain an outlet gas of acceptable odour, the rate of addition of the fresh hypochlorite solution was about 20 l/h and the effluent liquor had a nickel content of about 50 ppm by weight.

In another comparative experiment, the catalyst was disposed as a fixed bed in the gas space above the reservoir instead of in the recycle line. Thus the liquor from the packing passed through the bed before entering the reservoir. In this case the catalyst bed lost activity as a result of the deposition of oily non-volatile components entrained in the gas stream fed to the tower.

We claim:

1. A process for the removal of volatile organic or odoriferous substances from a gas stream comprising passing said gas stream through a scrubber, feeding an aqueous liquor having an oxidant selected from hydrogen peroxide and hypochlorite ions dissolved therein to the scrubber whereby said liquor flows through the scrubber in vapor/liquid contact with said gas stream and said substances are scrubbed from said gas stream into the aqueous liquor to give a loaded liquor containing said oxidant and said substances, collecting said loaded liquor from the scrubber, discharging a part of the collected liquor as an effluent stream, taking the remainder of the collected liquor as a recycle stream, adding a fresh aqueous solution of said oxidant to the recycle stream, feeding the recycle stream containing said fresh aqueous solution of said oxidant as the aqueous liquor fed to the scrubber, and, before addition of said fresh solution of oxidant, passing at least a part of the collected liquor including at least part of the recycle stream, through a fixed bed of a metal oxide catalyst for the decomposition of said oxidant said catalyst bed being disposed such that it is filled with liquor even when the flow of liquor is interrupted whereby said oxidant is decomposed and said substances are oxidized to less volatile or less odoriferous substances.

2. A process according to claim 1 wherein the flow of vapour and liquid through the scrubber is counter-current or transverse-current.

3. A process according to claim 1 wherein all the recycle stream passes through the catalyst bed before addition of the fresh solution of oxidant.

4. A process according to claim 1 wherein a reservoir is disposed beneath the scrubber and the catalyst bed is located within the reservoir whereby gas evolved as a result of the reaction occurring during passage of the liquor through the catalyst mixes with the gas stream undergoing treatment.

5. A process according to claim 1 wherein the catalyst bed is dimensioned such that the contact time of the liquor with the catalyst is 1 to 10 sec.

6. A process according to claim 1 wherein the catalyst comprises oxides of at least one metal selected from copper, iron, manganese, chromium, nickel, and cobalt.

7. A process according to claim 6 wherein the oxidant is hypochlorite and the catalyst comprises oxides of nickel or copper or mixtures thereof.

8. A process according to claim 1 wherein the effluent stream is taken from the liquor that has passed through the scrubber before passage of the liquor through said catalyst bed.

9. A process according to claim 8 wherein the effluent stream is passed through a further fixed bed of a oxidant decomposition catalyst to decompose residual oxidant to a level acceptable for discharge.

10. Apparatus for the treatment of a gas stream containing one or more volatile organic and/or odoriferous substances comprising:

a) a scrubber;

b) means to feed said gas stream through said scrubber;

c) means to feed an aqueous liquor having an oxidant dissolved therein to said scrubber whereby said liquor flows through said scrubber in vapour/liquid contact with said gas stream;

d) means to discharge part of the liquor that has passed through said scrubber as an effluent stream and means to recycle the remainder of said liquor as recycle liquor; and e) means to add a fresh solution of said oxidant to said recycle liquor to form the aqueous liquor fed to said scrubber;

f) a fixed bed of catalyst for the decomposition of said oxidant disposed such that it is filled with liquor even when the flow of liquor is interrupted; and g) means to pass at least part of the liquor that has passed through said scrubber through said catalyst bed before addition of the fresh oxidant solution to said recycle liquor.

* * * * *